(12) United States Patent
Katz et al.

(10) Patent No.: US 9,806,666 B2
(45) Date of Patent: Oct. 31, 2017

(54) SYSTEM AND METHOD FOR MOUNTING SOLAR PANEL FRAMES ON CORRUGATED ROOFING

(71) Applicants: David Katz, Arcata, CA (US); Marianne Walpert, Oakland, CA (US)

(72) Inventors: David Katz, Arcata, CA (US); Marianne Walpert, Oakland, CA (US)

( * ) Notice: Subject to any disclaimer, the term of this patent is extended or adjusted under 35 U.S.C. 154(b) by 0 days.

(21) Appl. No.: 14/804,908

(22) Filed: Jul. 21, 2015

(65) Prior Publication Data

US 2017/0025985 A1   Jan. 26, 2017

(51) Int. Cl.
F24J 2/52        (2006.01)
H02S 20/23       (2014.01)
F24J 2/00        (2014.01)

(52) U.S. Cl.
CPC ............... *H02S 20/23* (2014.12); *F24J 2/00* (2013.01)

(58) Field of Classification Search
CPC ......... Y02E 10/47; Y02E 10/50; Y02B 10/20; Y02B 10/12; Y02B 10/30; Y02B 10/14; Y02B 10/70; Y02B 10/10; Y02B 10/22; Y02B 30/52; Y02B 30/545; Y02B 80/32; H02S 20/23; H02S 20/00; H02S 20/24
USPC ......... 248/237; 52/173.3; 136/244, 251, 291
See application file for complete search history.

(56) References Cited

U.S. PATENT DOCUMENTS

| | | | |
|---|---|---|---|
| 2,879,961 A | 3/1959 | Bertram | |
| 5,152,107 A | 10/1992 | Strickert | |
| 7,703,256 B2 | 4/2010 | Haddock | |
| 8,220,210 B2 * | 7/2012 | Botkin | F24J 2/5211 126/623 |
| 8,424,821 B2 | 4/2013 | Liu | |
| 9,172,325 B2 * | 10/2015 | Klinga | H02S 20/00 |
| 9,395,103 B2 * | 7/2016 | Conley | H02S 20/30 |
| 2003/0070368 A1 * | 4/2003 | Shingleton | F24J 2/5205 52/173.3 |
| 2014/0102996 A1 * | 4/2014 | Pelman | F24J 2/5233 211/41.1 |

* cited by examiner

*Primary Examiner* — Steven Marsh
(74) *Attorney, Agent, or Firm* — Robert Brownstein

(57) ABSTRACT

The system and method invention herein disclosed and claimed is a bracket and mounting method used to mount a solar panel frame to a corrugated roof without requiring any tools or special skills.

7 Claims, 11 Drawing Sheets

Top view of lipped solar frame

Bottom view of lipped solar frame

US 9,806,666 B2

SYSTEM AND METHOD FOR MOUNTING SOLAR PANEL FRAMES ON CORRUGATED ROOFING

TECHNICAL FIELD

This invention is associated with frames used to mount solar panels.

BACKGROUND OF THE INVENTION

Dwellings in areas with no electrical utility infrastructure often depend upon fossil-fuel lamps for lighting after dark. Recent reductions in cost of solar panels is allowing people who utilize such dwellings to replace fossil-fuel lamp lighting with low-power electric lighting powered by solar cells and storage batteries.

The roofs of such dwellings are typically constructed of metallic corrugated materials. Currently when mounting solar panel frames on such roofs, mounting infrastructure requires that holes be drilled in the corrugated roofing, and after installation, such holes must be appropriately sealed to prevent water leaks. For example, U.S. Pat. No. 8,424,821 discloses a mounting bracket that relies on holes drilled in the roofing sheet and screws that fasten bracket portions to the roof panels that protrude through said holes.

In areas where such dwellings are associated with very low incomes, the cost of mounting such solar panel frames can be prohibitive. On the other hand, mounting such frames on ground surfaces may often result in theft.

Ideally, a mounting system and method that does not require tools or special skills, and enables one to mount solar panel frames near the roof peak could both mitigate the cost of installation and the incidence of theft.

BRIEF SUMMARY OF THE INVENTION

The invention herein disclosed and claimed is a bracket designed for mounting common solar panel frames to corrugated roofing, without requiring tools or holes to be drilled, and without requiring any special skills. Attached to the bottom portion of a solar panel frame, the mounting bracket hooks onto the top edges of the corrugated roofing sheet but resides under the flashing located at the roof peak. Once so hooked, and with the frame pulled downward along the roof slope to set the hook, the hook becomes firmly engaged. At the bottom of the bracket is a pad coated with adhesive material and a peel-off protection covering. Once the hook is set on the top portion of the bracket, the peel-off layer is removed and the pad is pressed firmly down on the corrugated roofing adhering to the peaks of two adjacent folds. Affixed now with the hook at the top of the bracket and the pad at the bottom of the bracket, the solar panel frame will be securely mounted to the corrugated roofing.

The method for installing takes a few minutes. The bracket is attached to the bottom of a solar panel frame. The hook end of the bracket is inserted under the peak flashing and moved into position where it can engage and hook to the top edge of the corrugated roofing. Once so engaged, the frame is pulled downward along the slope to set the hook firmly in place. Next, the peel-off material is removed and the pad end of the bracket is pressed firmly against the corrugated roofing surface. The pad width is such that it straddles two adjacent folds and adheres to the peaks of those folds. The mounting method requires no tools or retrofitting of the corrugated roofing material, such as holes drilled.

BRIEF DESCRIPTIONS OF THE DRAWINGS

Figure 4:
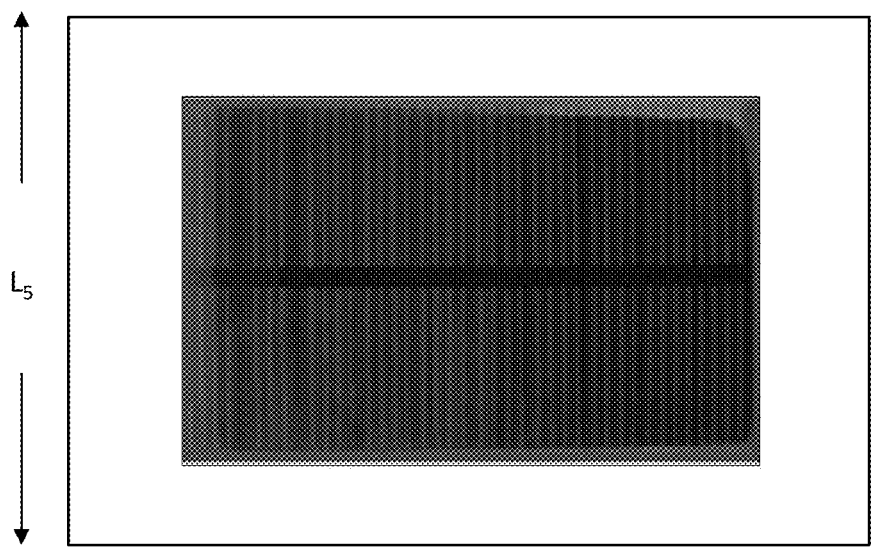
Figure 4:
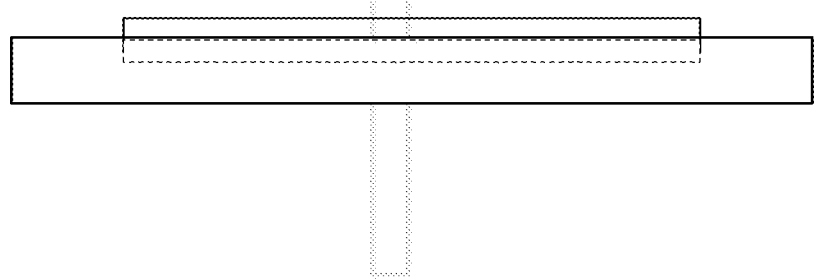

FIG. 4 depicts a second type of solar panel frame without a bottom lipped construction. Here the sides are perpendicular to the top of the frame and extend downward. There are no lipped structures.

Figure 5:
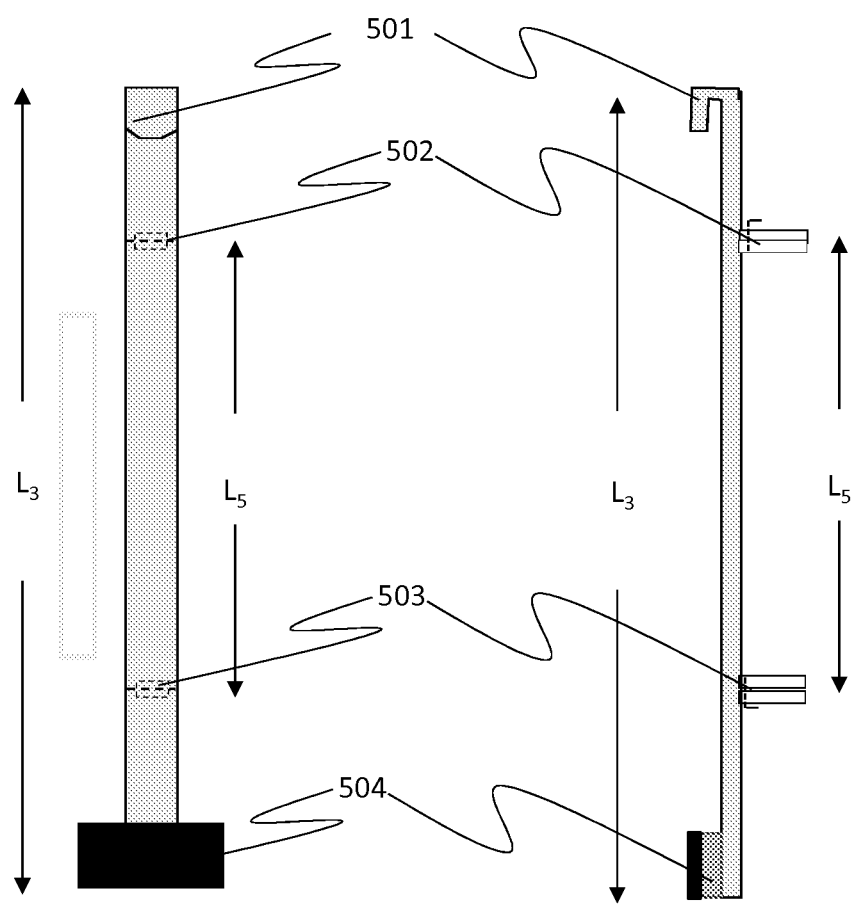

FIG. 5 shows another embodiment of the invention bracket suitable for non-lipped solar panel frames. A bottom view (left side of sheet) and side view (right side of sheet) are shown.

Figure 6:
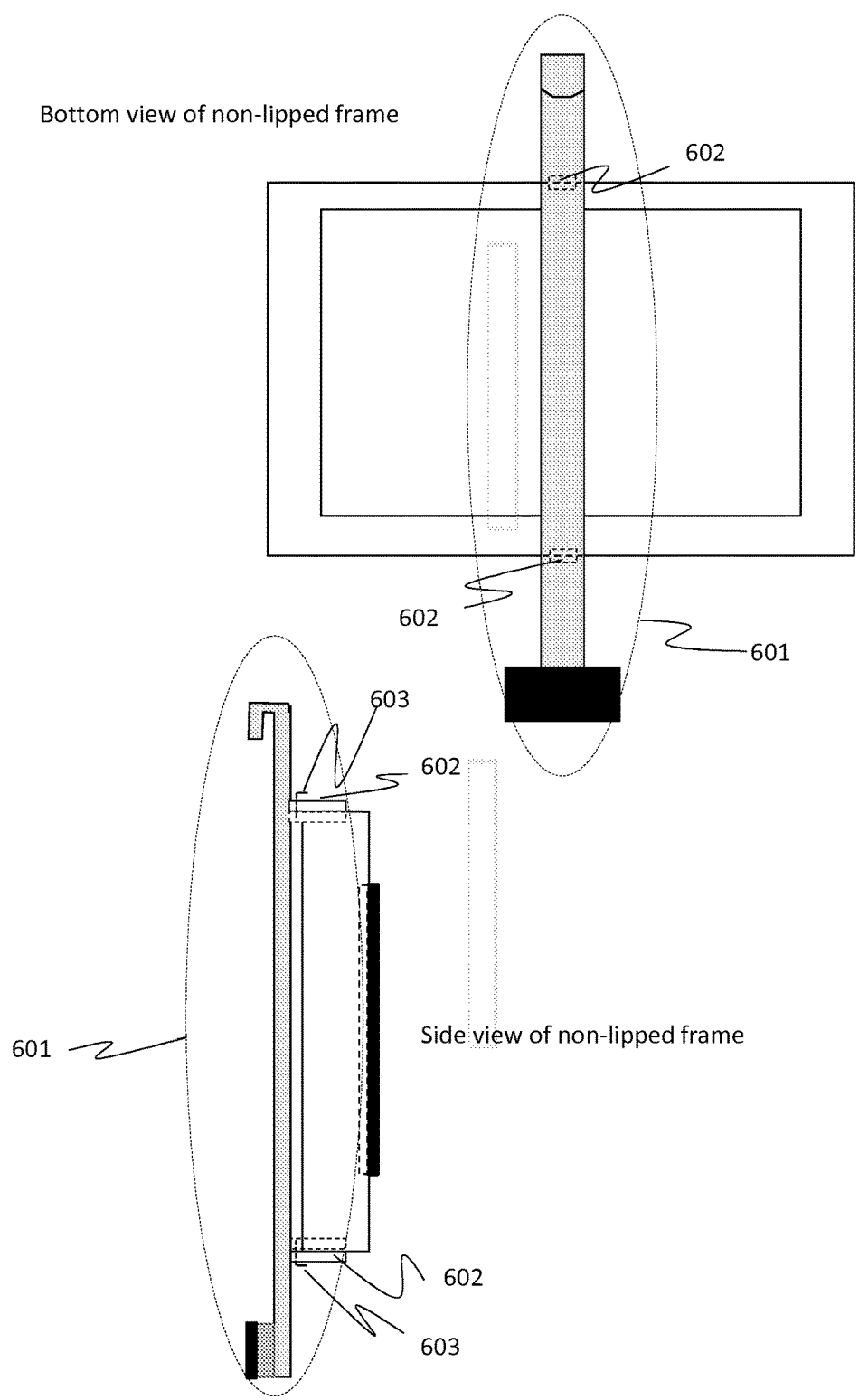

FIG. 6 depicts the invention embodiment of FIG. 5 attached to a non-lipped solar panel frame. A bottom view (top of sheet) and side view (bottom/left of sheet) are shown.

Figure 7:
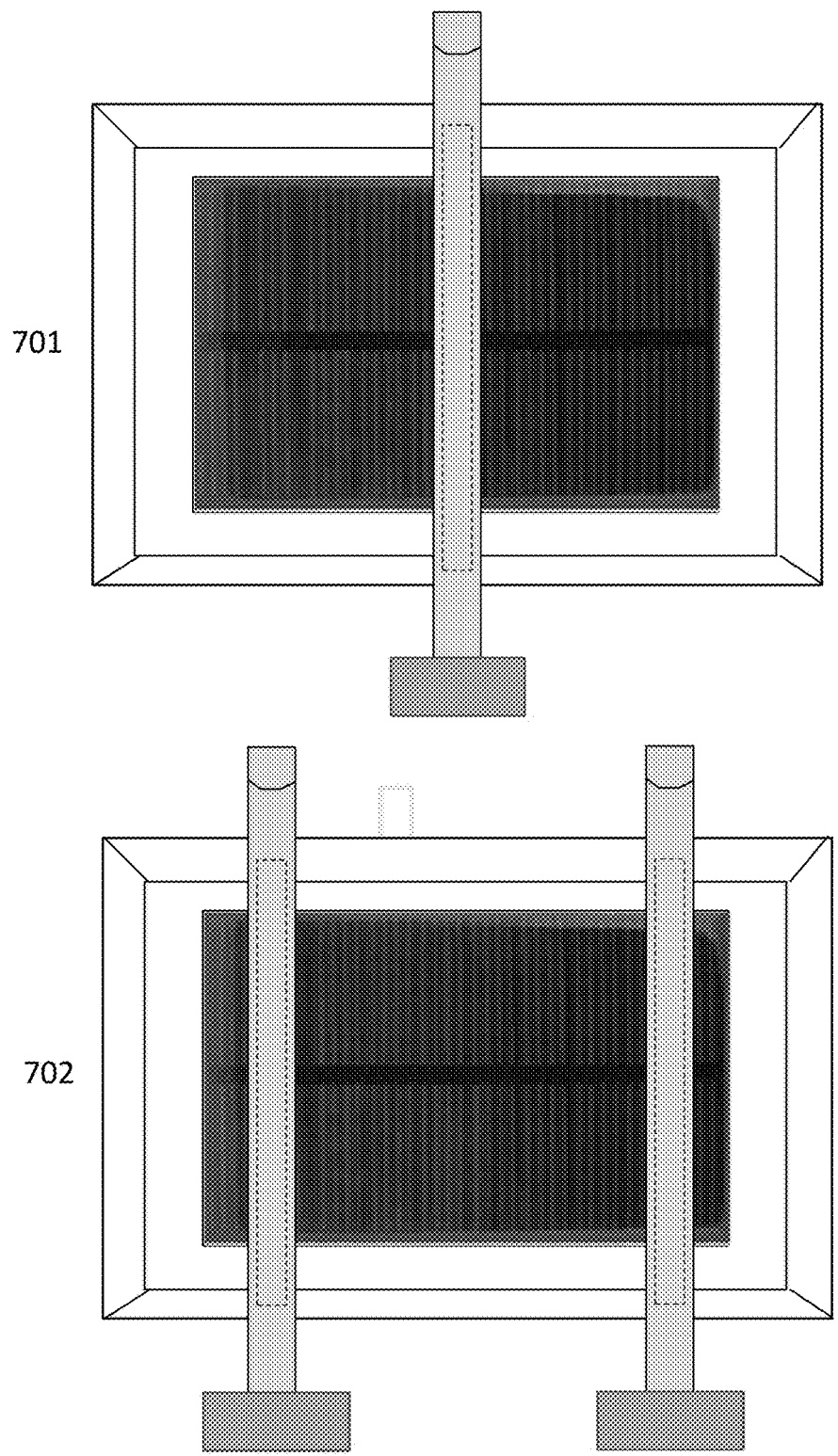

FIG. 7 shows a single invention bracket (701) installed on a lipped solar panel frame. View 702 shows more than one bracket installed on a lipped solar panel frame.

Figure 8:
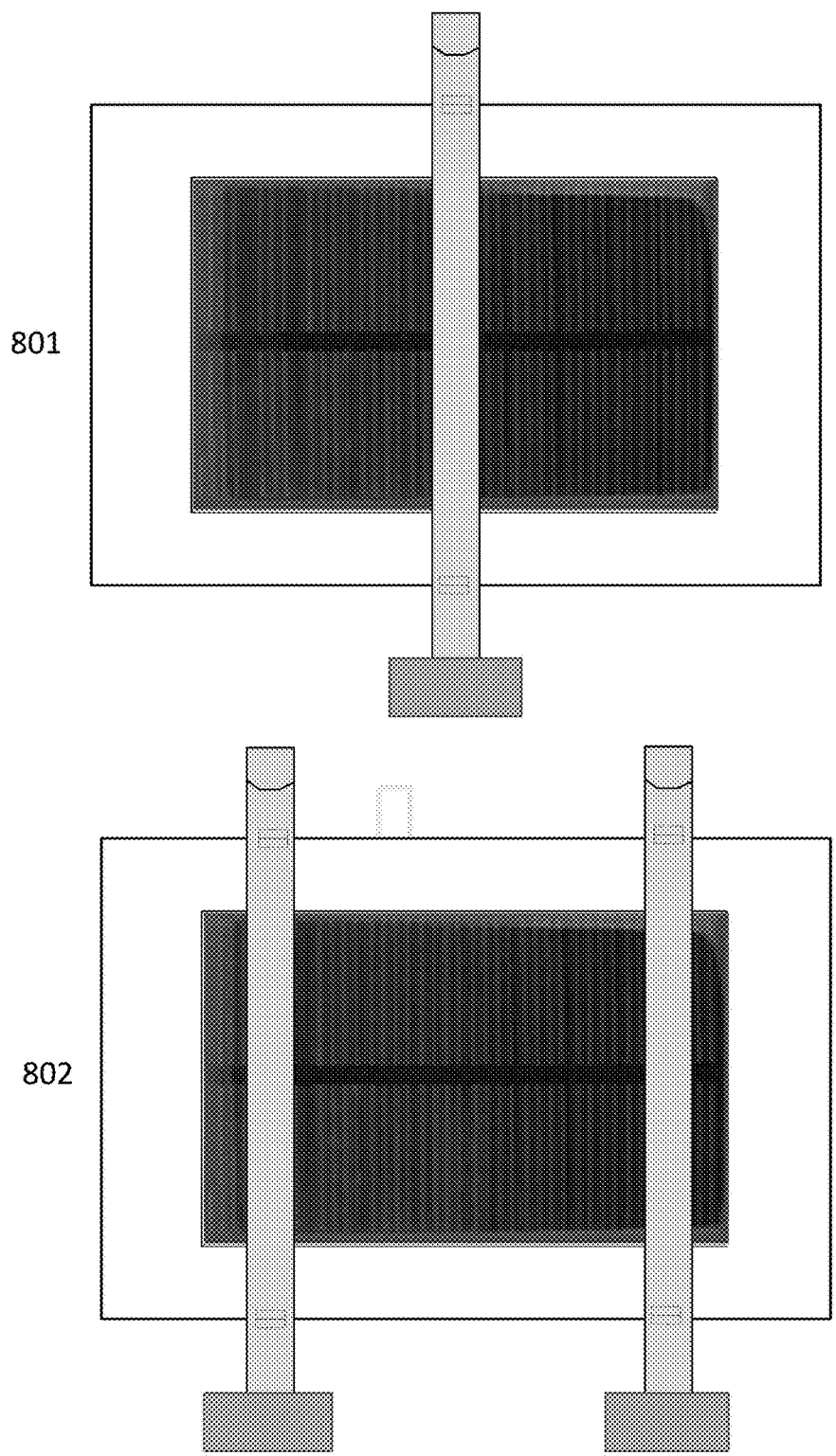

FIG. 8 shows a single invention bracket (view 801) installed on a non-lipped solar panel frame. View 802 shows more than one bracket installed on a non-lipped solar panel frame.

Figure 9:
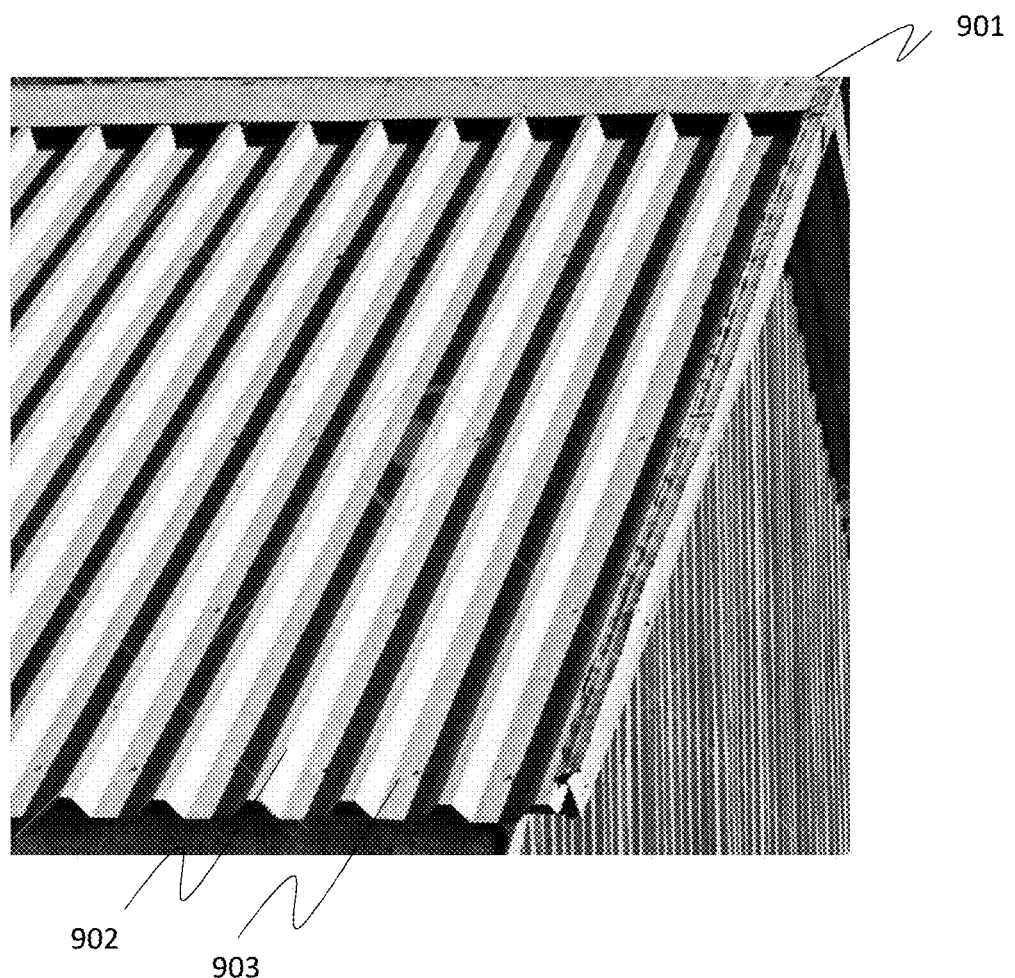

FIG. 9 shows a portion of a corrugated roof. A flashing strip, 901, is shown at the roof peak where the corrugated roof sheets converge. The corrugated roof sheet consists of a series of parallel folds having peaks (902) and troughs (903).

Figure 10:
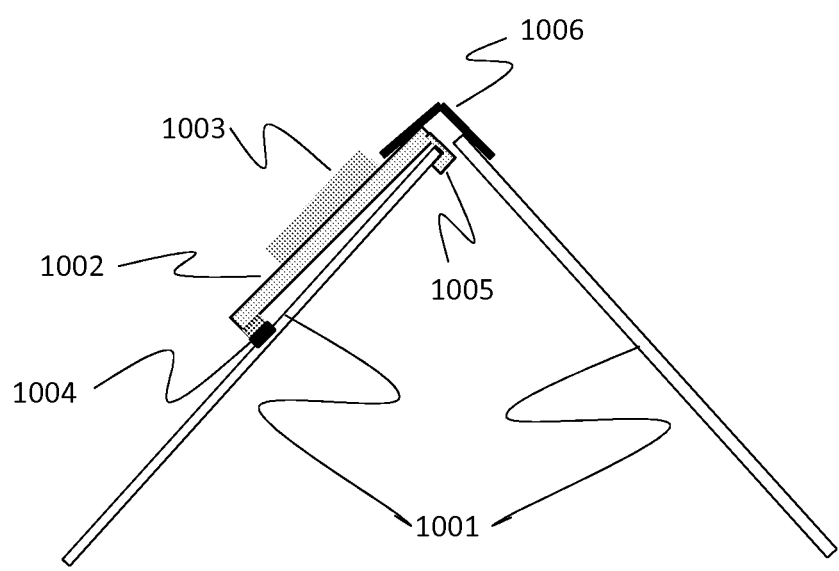

FIG. 10 is a side view of a corrugated roof wherein the two roofing sheets (1001) converge toward the roof peak and a covered by a flashing strip (1006). The solar frame (1003), mounted on the bracket (1002) is pushed such that the hook end for the bracket (1005) passes under the flashing and engages the top edge of the left-hand roofing sheet.

Figure 11:
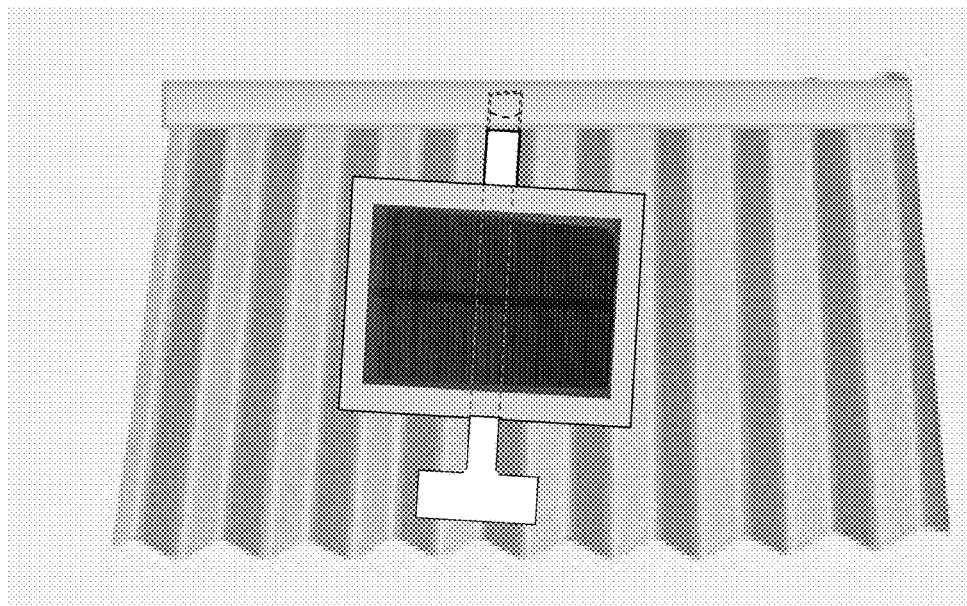

FIG. 11 depicts a mounted solar frame, using a single invention bracket positioned essentially midway between the sides of the solar frame that are parallel to the invention bracket.

Figure 12:
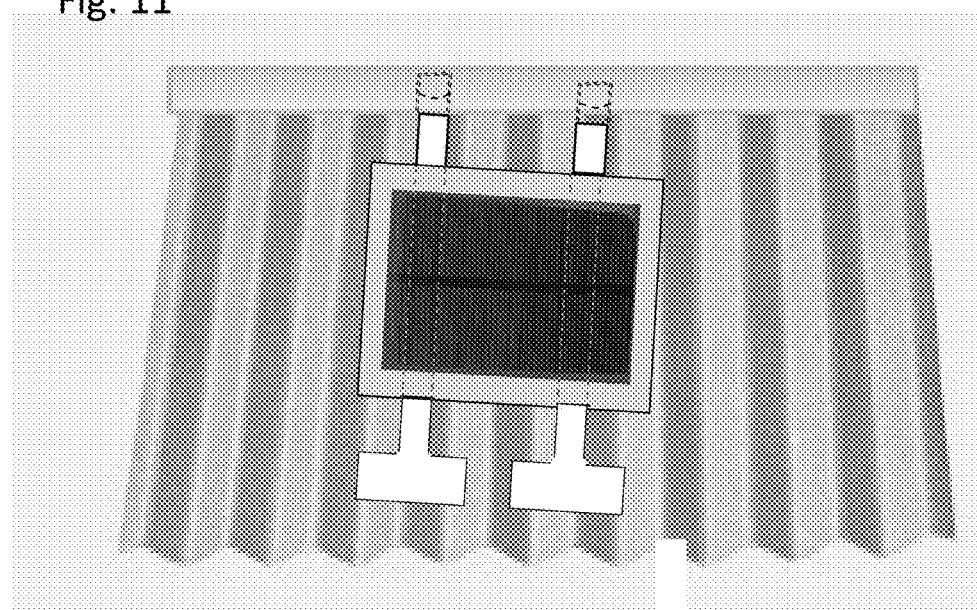

FIG. 12 depicts a mounted solar frame, using more than one invention bracket, positioned between the sides of the solar frame that are parallel to the invention brackets, and to where they can engage the top edge of more than one roofing-sheet trough.

DETAILED DESCRIPTION OF THE INVENTION

Dwellings in rural areas of a country, or in outlying villages, may have no access to electrical utility infrastructure. Lighting, after dark, therefore may depend upon fossil-fuel lamps. The fuel must be purchased and transported to the dwelling. Proper ventilation must be provided to avoid asphyxiation during use.

Alternative lighting using solar panel and batteries offer a safer and longer-term less costly means for after-dark lighting. Solar panels are commonly offered mounted to frames which then must be mounted to a roof or ground surface location.

The roofs in many such dwellings are made of corrugated materials, and mounting such solar panel frames typically involves roofing retrofitting, such as drilling of mounting holes, and then sealing, after installation, to prevent water leaks. Such mounting infrastructure and methods require special tools and skills and can be prohibitively costly for those living in such dwellings.

The invention herein disclosed and claimed is a system for mounting such solar panel frames, and method for doing so, that requires no tools or special skills, and can be done in minutes.

Figure 1:
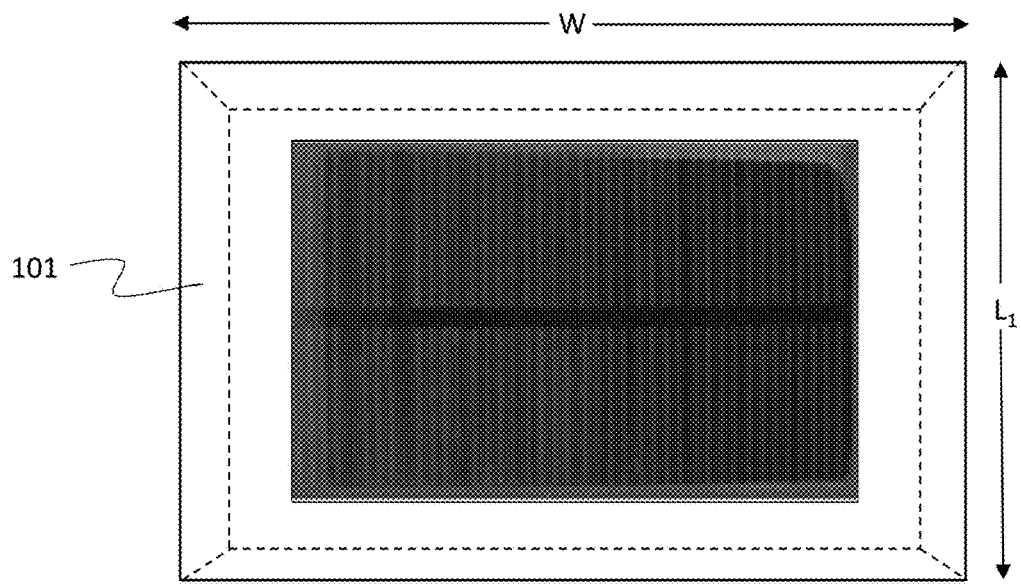
FIG. 1 depicts a solar panel frame with a lipped structure on its bottom. A top view and bottom view are illustrated.
Figure 1:
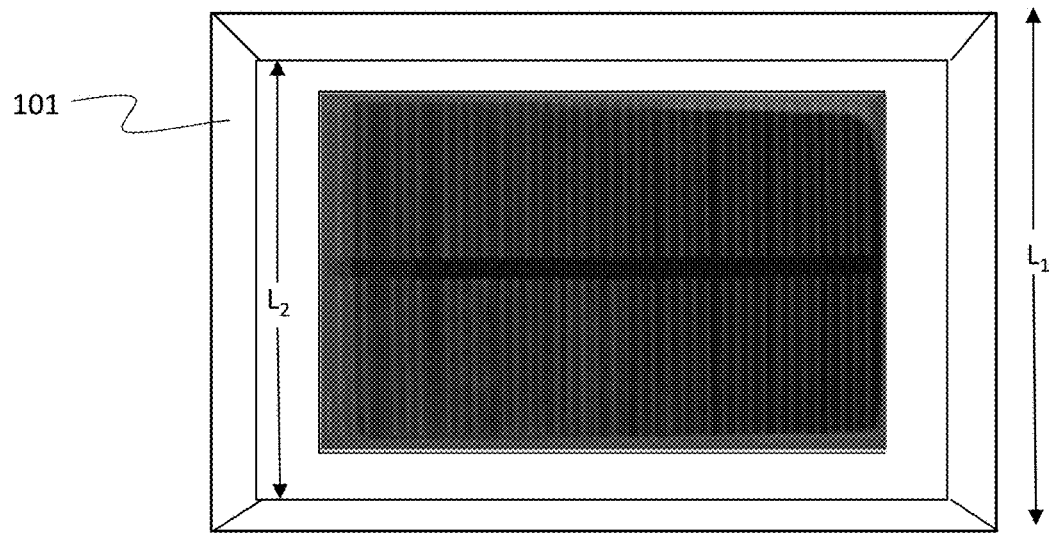

FIG. 1 shows a top view and bottom view of a solar panel frame where the bottom of the frame has a lip structure whose surface is essentially parallel to the top frame surface. The lip surface is shown (101). Such frames are typically rectangular and mounted with two longest sides (W) essentially parallel to the roof top. The sides ($L_1$) are essentially perpendicular to the roof top. The distance between the edges of opposite lip surfaces, parallel to the longest sides, is $L_2$.

Figure 2:
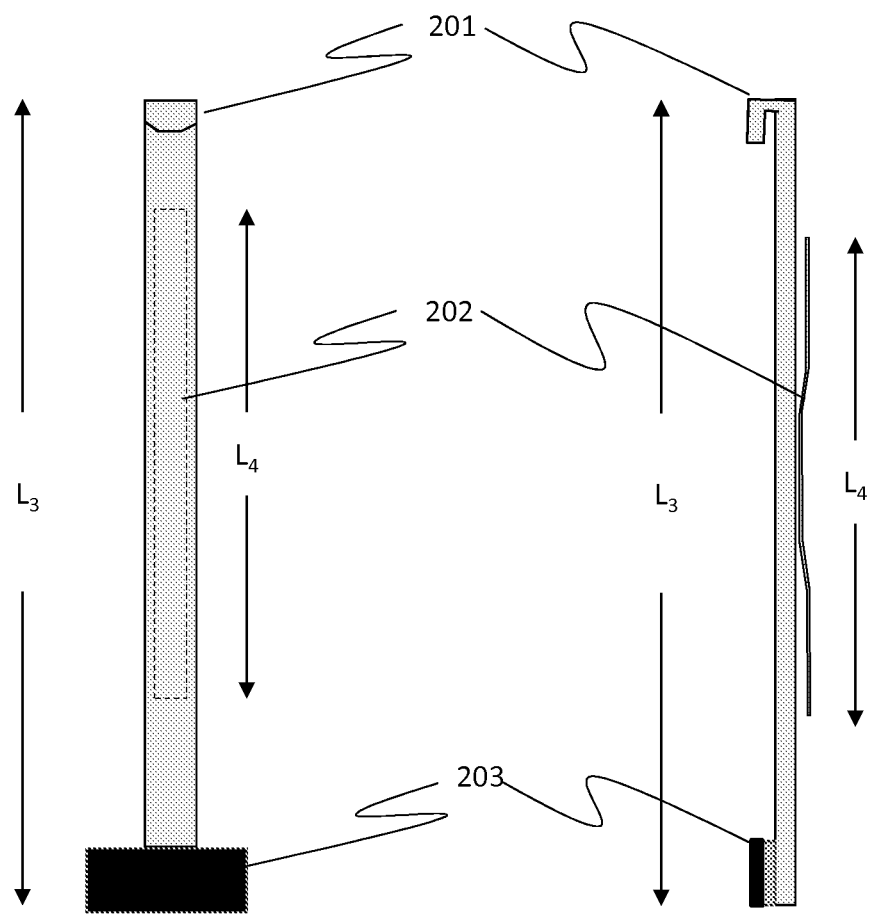
FIG. 2 depicts one embodiment of the system invention bracket. A bottom view (left) and side view (right) are shown.

FIG. 2 illustrates one embodiment of the system invention. It is bracket with a hook-like end (201) and a pad coated with adhesive material at the opposite end (203). The length, L3 is longer than the length of a solar panel frame, for example, L1 in FIG. 1. When attached to the bottom of a lipped solar panel frame, the hook-like end extends beyond the frame so as to allow it to be inserted under roof-top flashing; and the pad with adhesive coating extends beyond the frame such that no portion of the pad is directly beneath the solar panel frame. The width of the pad is such that it will straddle the peaks of two adjacent folds in the corrugated roofing panel. A substructure (202) is affixed to the bracket and provides a means for attaching said bracket to the lip surface on the solar panel frame bottom. The length of substructure 202 is larger than the distance between the edges of two opposite lip structures parallel to the longest sides of the frame. As such, when the bracket is attached to the solar panel frame, the ends of substructure 202 extend underneath the lip structure and clamp the lip structure to the bracket. The substructure 202 is sufficiently flexible to allow the lip structure to be inserted between said substructure and bracket, and is sufficiently rigid as to provide a tight fit essentially firmly attaching the bracket to the solar panel frame. FIG. 2 shows substructure 202 as a singular element. Alternatively, it could be implemented using two smaller elements (not shown), displaced from one another along the longest dimension of the bracket, and oriented such that one end of each element is operative to extend under the lip of frame and clamp it to the bracket.

Figure 3:
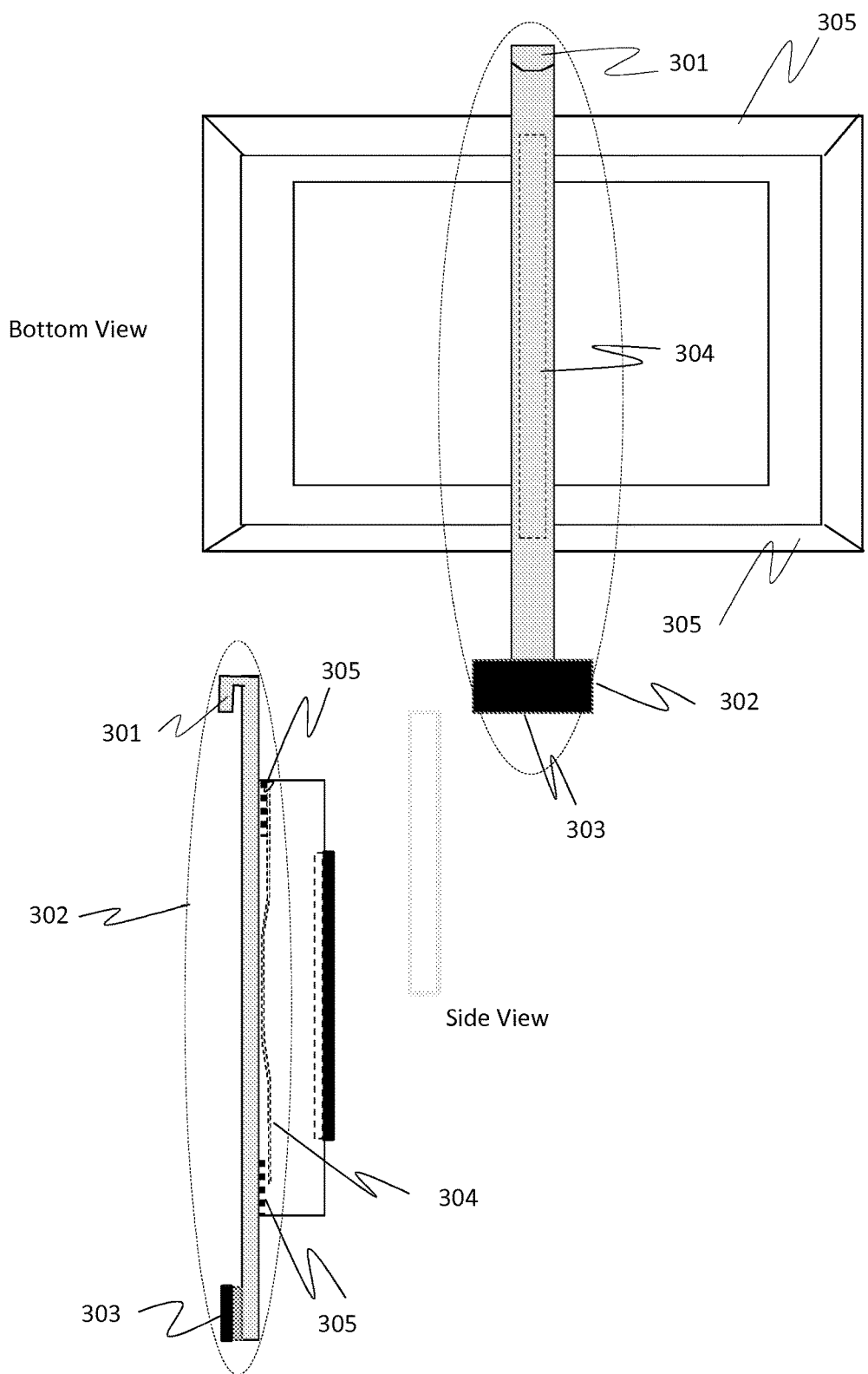
FIG. 3 depicts the invention embodiment of FIG. 2 installed on a lipped solar panel frame. A bottom view (top of sheet) and side view (bottom/left of sheet) are shown.

FIG. 3 illustrates the embodiment (302) of FIG. 2 attached to the bottom of a solar panel frame. A bottom view (top of sheet) and side view (bottom/left of sheet) show the interface between solar panel frame and embodiment. The hook end (301) extends upward beyond the frame to allow it to be inserted under the roof-top flashing. The pad (303) extends below the frame such that no portion of the pad is located directly below the solar panel frame. As shown in the bottom view, the substructure 304 is longer the distance between the edges of the lipped structure. As shown in the side view, the substructure 304 essentially clamps the lipped structure 305 between its ends and the surface of the bracket, forming a tight connection.

FIG. 4 depicts a second type of solar panel frame, one that has no lipped surface on its bottom. Instead, the sides of this solar panel frame extend perpendicular to the top surface of the frame. The distance between the edges of the two opposite longest sides is shown as $L_5$.

FIG. 5 illustrates another embodiment of the system invention. The length of the bracket, L3 is greater than L5 (FIG. 4) such that the hook-end (501) can extend beyond the solar panel frame and be inserted under the roof-top flashing; and the pad end (504) extends below the solar panel frame such that no portion of 504 is located directly below the solar panel frame. Substructures 502 and 503 are essentially identical. They comprise two surfaces which form a clamp holding the non-lipped sides of a solar panel frame. The distance between the two substructures (502 and 503) is essentially L5, the distance between the solar panel frame sides on upper and lower portion of the solar panel frame. The position of 502 and 503 can be adjusted for differing lengths of L5. A tightening mechanism applies pressure by the two surfaces forming the clamp such that sufficient pressure is exerted against the solar panel frame sides as to provide a firm attachment of bracket to frame.

FIG. 6 illustrates how the embodiment of FIG. 5 (601) attaches to a non-lipped solar panel frame. The substructures 602 are located in the positions of the upper and lower side edges. The edges are inserted between the structures of 602 and then tightening pressure is applied using tightening mechanism 603.

FIG. 7 illustrates how the embodiment of FIG. 2 is attached to a lipped solar panel frame. In view 701, a single bracket is used to mount the solar panel frame. In view 702, more than one bracket is used to mount the solar panel frame. When a single bracket is employed, it is located essentially midway between the edges of the panel frame parallel to the bracket. The mounted frame and bracket are then positioned to allow the hook end to extend underneath a roofing-sheet flashing and to engage a roofing-sheet trough. When more than one bracket is employed, they are positioned between the sides of the panel frame parallel to them such that the hook ends can extend underneath a roofing-sheet flashing and the hook ends can engage separated roofing-sheet troughs.

FIG. 8 illustrates how the embodiment of FIG. 5 is attached to a non-lipped solar panel frame. In view 801, a single bracket is used to mount the solar panel frame. In view 802, more than one bracket is used to mount the solar panel frame. When a single bracket is employed, it is located essentially midway between the edges of the panel frame parallel to the bracket. The mounted frame and bracket are then positioned to allow the hook end to extend underneath a roofing-sheet flashing and to engage a roofing-sheet trough. When more than one bracket is employed, they are positioned between the sides of the panel frame parallel to them such that the hook ends can extend underneath a roofing-sheet flashing and the hook ends can engage separated roofing-sheet troughs.

FIG. 9 illustrates a typical corrugated roof. Two corrugated sheets (only one shown) form the inverted v-shaped roof. The sheets are formed in manufacturing into parallel folds, forming peaks (902) and troughs (903), which extend from the roof peak and are essentially perpendicular to the said roof peak. At the roof peak, where the edges of two corrugated roofing sheets converge to their nearest point, a flashing strip covers the edges and extends downward on both sides of the roof peak preventing rain from leaking between the convergent roof sheet edges.

FIG. 10 illustrates how a solar frame, affixed to the mounting bracket invention, is then attached to the corrugated roof. The roofing sheets 1001 follow the framed roof line and the upper edges converge toward one another at the roof peak. A flashing strip, 1006, as shown, runs along the rough peak, above the converging roofing-sheet edges, and extends downward beyond those roof-peak edges preventing rain leakage between said roof-peak edges. The solar frame 1003, now mounted to the invention mounting bracket, 1002, is positioned such that the hook end, 1005, extends underneath the flashing, 1006. It is then pushed upward far enough up to engage the edge of the roofing sheet trough. Next, it is pulled downward until the hook is firmly set. The peel-off covering of the pad, 1004, is then peeled away and the pad pressed firmly against the roofing sheet, straddling two adjacent fold peaks and adhering to said peaks.

FIG. 11 illustrates a solar panel frame attached to a single bracket and installed on a corrugated roofing sheet. As shown, the hook end is below the roof-top flashing where it can engage the roof sheet trough edge and hook onto it. The pad at the lower portion of the bracket is pressed firmly against the roofing sheet such that it straddles two adjacent fold peaks, and its adhesive coating adheres to the roofing sheet peaks.

FIG. 12 illustrates a solar panel frame attached to more than one bracket and installed on a corrugated roofing sheet. The multiple brackets can be moved, laterally, to line up with the appropriate positions of the roofing sheet trough edges. Once lined up, the multiple hook ends are inserted below the roof-top flashing and hooked onto the roofing sheet trough edges. The pads at the lower portion of the brackets are pressed firmly against the roofing sheet such that their adhesive coating adheres to the peaks of two adjacent folds on the roofing sheet.

The illustrated embodiments are meant to be exemplary and should not be read as limiting. The invention dimensions of width and thickness are determined by the materials used to fabricate the invention, and the size of the solar panel frame to be mounted. The length dimensions of the bracket are determined by the distance between the solar panel frame sides which will be oriented parallel to the roof peak line. As described, the length will be longer than the distance between the said solar panel frame sides so as to allow the hook end to be inserted under the roof-top flashing and such that the flexible pad end extends beyond the solar panel frame and no part is located directly below said solar panel frame. The length of the substructure for attaching to lipped solar panel frames will be longer than the distance between the lip structure edges of the sides oriented parallel to the roof peak line. The position of the substructures for attaching to a non-lipped solar panel frame will be essentially the distance between the edges of the sides of a non-lipped solar panel frame, said sides to be oriented parallel to the roof peak line. The width of the bracket and the pad is determined by the distance between adjacent peaks of the folds on the roofing panel. The bracket width will be less than the distance between said adjacent peaks; and the pad width will be wider than the distance between said adjacent peaks.

The invention bracket disclosed and claimed herein can be made of different materials. The mounted solar panel frames are exposed to extremes of heat, wind and rain. The materials must be such that the bracket thus fabricated resists lateral movement of the mounted solar panel frame, upward lifting of the mounted solar panel frame, and the decomposition of the bracket due to extremes of heat, rain or wind.

What is claimed is:
1. A mounting bracket comprising:
   a rectangular structure;
   a hook substructure on one end of a longest dimension of said rectangular structure operative to be inserted under corrugated roof flashing and engage the an edge of an underlying corrugated roof section;
   an adhesive pad substructure on an opposite end of said longest dimension of said rectangular structure operative to adhere to the a surface of a corrugated roof section.
2. A claim as in claim 1 further comprising:
   a lip attachment substructure, or more than one substructure, operative to attach to a thin surface essentially parallel to said rectangular structure.
3. A claim as in claim 1 further comprising:
   a side attachment substructure, or more than one substructure, operative to attach to a thin surface essentially perpendicular to said rectangular structure.
4. A claim as in claim 1 further comprising:
   said pad substructure having an adhesive coating on one side.
5. A claim as in claim 1 further comprising:
   said rectangular structure wherein said longest dimension is greater than the outer dimension between the sides of a frame to be mounted on said rectangular structure, said sides of said frame to be oriented essentially perpendicular to said longest dimension when mounted.
6. A claim as in claim 2 further comprising:
   said lip attachment substructure, or substructures, essentially rectangular in shape, attached to said rectangular structure with said lip attachment's longest edges parallel to said longest dimension of said rectangular structure.
7. A claim as in 3 further comprising:
   said side attachment substructure, or substructures, comprising clamp substructures, attached to said rectangular structure and displaced from one another along a line parallel to said longest dimension of said rectangular structure.

* * * * *